United States Patent
Lin et al.

(10) Patent No.: US 8,408,815 B2
(45) Date of Patent: Apr. 2, 2013

(54) OPTICAL FIBER CONNECTOR AND ADAPTER

(75) Inventors: I En Lin, Taipei (TW); Tomoyuki Mamiya, Marlboro, MA (US); Jyh Cherng Yang, Taipei (TW); Jeffery Gniadek, Marlboro, MA (US)

(73) Assignees: Senko Advanced Components, Inc., Marlboro, MA (US); Protai Photonic Co. Ltd., Sinjhuang, Taipei County (TW)

( * ) Notice: Subject to any disclaimer, the term of this patent is extended or adjusted under 35 U.S.C. 154(b) by 216 days.

(21) Appl. No.: 12/636,611

(22) Filed: Dec. 11, 2009

(65) Prior Publication Data

US 2010/0322561 A1 Dec. 23, 2010

Related U.S. Application Data

(63) Continuation-in-part of application No. 12/533,340, filed on Jul. 31, 2009, now abandoned.

(30) Foreign Application Priority Data

Jun. 18, 2009 (TW) .............................. 98120388 A

(51) Int. Cl.
*G02B 6/36* (2006.01)
(52) U.S. Cl. ................ 385/88; 385/76; 385/78; 385/92
(58) Field of Classification Search ............... 385/55, 385/56, 60, 76, 78, 88, 92
See application file for complete search history.

(56) References Cited

U.S. PATENT DOCUMENTS

| | | | |
|---|---|---|---|
| 4,762,388 A * | 8/1988 | Tanaka et al. ................... | 385/58 |
| 4,764,129 A * | 8/1988 | Jones et al. ................... | 439/677 |
| 4,840,451 A * | 6/1989 | Sampson et al. ................ | 385/89 |
| D323,143 S | 1/1992 | Ohkura et al. | |
| 5,212,752 A * | 5/1993 | Stephenson et al. ............ | 385/78 |
| 5,317,663 A | 5/1994 | Beard et al. | |
| 5,348,487 A | 9/1994 | Marazzi et al. | |
| 5,444,806 A | 8/1995 | de Marchi et al. | |
| 5,481,634 A | 1/1996 | Anderson et al. | |
| 5,506,922 A | 4/1996 | Grois et al. | |
| 5,570,445 A | 10/1996 | Chou et al. | |
| 5,588,079 A * | 12/1996 | Tanabe et al. ................... | 385/78 |
| 5,684,903 A | 11/1997 | Kyomasu et al. | |
| 5,687,268 A | 11/1997 | Stephenson et al. | |
| 5,937,130 A | 8/1999 | Amberg et al. | |
| 5,956,444 A | 9/1999 | Duda et al. | |

(Continued)

FOREIGN PATENT DOCUMENTS

CN 2836038 Y 11/2006
CN 201383588 Y 1/2010

(Continued)

OTHER PUBLICATIONS

"Fiber Optic Connectors and Assemblies Catalog" 2009, Huber & Suhner Fiber Optics, Herisau, Switzerland, http://www.google.co.in/url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2E2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

(Continued)

*Primary Examiner* — Rhonda Peace
(74) *Attorney, Agent, or Firm* — Pepper Hamilton LLP

(57) ABSTRACT

An optical fiber connector and adapter according to the present invention are provided. At least one indentation is formed on the connector and a protrusion mating with the indentation is formed within the adapter thereby physically limiting the insertion of a connector into a particular adapter.

8 Claims, 5 Drawing Sheets

U.S. PATENT DOCUMENTS

| | | | | |
|---|---|---|---|---|
| 5,971,626 | A | 10/1999 | Knodell et al. | |
| 6,041,155 | A | 3/2000 | Anderson et al. | |
| RE37,080 | E * | 3/2001 | Stephenson et al. | 385/78 |
| 6,206,577 | B1 | 3/2001 | Hall, III et al. | |
| 6,206,581 | B1 | 3/2001 | Driscoll et al. | |
| 6,227,717 | B1 | 5/2001 | Ott et al. | |
| 6,247,849 | B1 | 6/2001 | Liu | |
| 6,461,054 | B1 | 10/2002 | Iwase | |
| 6,478,472 | B1 | 11/2002 | Anderson et al. | |
| 6,551,117 | B2 | 4/2003 | Poplawski et al. | |
| 6,579,014 | B2 | 6/2003 | Melton et al. | |
| 6,648,520 | B2 | 11/2003 | McDonald et al. | |
| 6,854,894 | B1 | 2/2005 | Yunker et al. | |
| 7,090,406 | B2 | 8/2006 | Melton et al. | |
| 7,090,407 | B2 | 8/2006 | Melton et al. | |
| 7,091,421 | B2 | 8/2006 | Kukita et al. | |
| 7,111,990 | B2 | 9/2006 | Melton et al. | |
| 7,113,679 | B2 | 9/2006 | Melton et al. | |
| D533,504 | S | 12/2006 | Lee | |
| D534,124 | S | 12/2006 | Taguchi | |
| 7,150,567 | B1 | 12/2006 | Luther et al. | |
| 7,153,041 | B2 * | 12/2006 | Mine et al. | 385/92 |
| 7,198,409 | B2 | 4/2007 | Smith et al. | |
| 7,207,724 | B2 | 4/2007 | Gurreri | |
| D543,146 | S | 5/2007 | Chen et al. | |
| 7,258,493 | B2 * | 8/2007 | Milette | 385/55 |
| D558,675 | S | 1/2008 | Chien et al. | |
| 7,315,682 | B1 | 1/2008 | En Lin et al. | |
| 7,325,976 | B2 | 2/2008 | Gurreri et al. | |
| 7,325,980 | B2 | 2/2008 | Pepe | |
| 7,329,137 | B2 | 2/2008 | Martin et al. | |
| 7,354,291 | B2 | 4/2008 | Caveney et al. | |
| 7,387,447 | B2 * | 6/2008 | Mudd et al. | 385/75 |
| 7,390,203 | B2 | 6/2008 | Murano et al. | |
| D572,661 | S | 7/2008 | En Lin et al. | |
| 7,431,604 | B2 | 10/2008 | Waters et al. | |
| 7,463,803 | B2 | 12/2008 | Cody et al. | |
| 7,465,180 | B2 | 12/2008 | Kusuda et al. | |
| 7,561,775 | B2 | 7/2009 | Lin et al. | |
| 7,591,595 | B2 | 9/2009 | Lu et al. | |
| 7,594,766 | B1 | 9/2009 | Sasser et al. | |
| 7,641,398 | B2 | 1/2010 | O'Riorden et al. | |
| 7,695,199 | B2 | 4/2010 | Teo et al. | |
| 7,699,533 | B2 | 4/2010 | Milette | |
| 7,824,113 | B2 | 11/2010 | Wong et al. | |
| D641,708 | S | 7/2011 | Yamauchi | |
| 8,251,733 | B2 | 8/2012 | Wu | |
| 2004/0052473 | A1 | 3/2004 | Seo et al. | |
| 2004/0136657 | A1 | 7/2004 | Ngo | |
| 2004/0141693 | A1 * | 7/2004 | Szilagyi et al. | 385/55 |
| 2004/0161958 | A1 | 8/2004 | Togami et al. | |
| 2006/0089049 | A1 | 4/2006 | Sedor | |
| 2006/0269194 | A1 | 11/2006 | Luther et al. | |
| 2007/0149062 | A1 | 6/2007 | Long et al. | |
| 2007/0230874 | A1 | 10/2007 | Lin | |
| 2007/0232115 | A1 | 10/2007 | Burke et al. | |
| 2007/0243749 | A1 | 10/2007 | Wu | |
| 2008/0044137 | A1 | 2/2008 | Luther et al. | |
| 2008/0069501 | A1 * | 3/2008 | Mudd et al. | 385/75 |
| 2008/0101757 | A1 | 5/2008 | Lin et al. | |
| 2008/0226237 | A1 | 9/2008 | O'Riorden et al. | |
| 2008/0267566 | A1 | 10/2008 | Lin et al. | |
| 2009/0028507 | A1 | 1/2009 | Jones et al. | |
| 2009/0214162 | A1 | 8/2009 | O'Riorden et al. | |
| 2009/0220197 | A1 | 9/2009 | Gniadek | |
| 2010/0034502 | A1 | 2/2010 | Lu et al. | |
| 2011/0044588 | A1 | 2/2011 | Larson et al. | |
| 2011/0131801 | A1 | 6/2011 | Nelson et al. | |
| 2011/0177710 | A1 | 7/2011 | Tobey | |

FOREIGN PATENT DOCUMENTS

| | | | |
|---|---|---|---|
| DE | 202006011910 U1 | 3/2007 | |
| DE | 102006019335 A1 | 10/2007 | |
| EP | 1074868 A1 | 7/2001 | |
| EP | 1566674 A1 | 8/2005 | |
| JP | 2009/229545 A | 10/2009 | |
| JP | 2009/276493 A | 11/2009 | |
| WO | WO 01/79904 A2 | 10/2001 | |
| WO | WO 2008/112986 A1 | 9/2008 | |
| WO | WO 2009/135787 A1 | 11/2009 | |

OTHER PUBLICATIONS

"Fiber Optic Interconnect Solutions, Tactical Fiber Optic Connectors, Cables and Termini" 2006, Glenair, Inc., Glendale, California, http://www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, http://www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

* cited by examiner

OPTICAL FIBER CONNECTOR AND ADAPTER

CROSS REFERENCE TO RELATED APPLICATION

This application is a continuation-in-part application of U.S. Ser. No. 12/533,340 filed Jul. 31, 2009, which claims the priority benefit of Taiwan Patent Application Serial Number 098120388 filed Jun. 18, 2009, the full disclosures of which are incorporated herein by reference in their entirety.

BACKGROUND OF THE INVENTION

1. Field of the Invention

The invention relates to an optical fiber connector and adapter, and more particularly, to an optical fiber connector and adapter with keyed features.

2. Description of the Related Art

Optical fibers terminated by connectors and the adapters which are adapted to receive these connectors are an important part of virtually any fiber optical communication systems. For example, such connectors and adapters may be used to interconnect fiber segments to create longer lengths, to connector optical fiber to active or passive devices, etc. However, in some cases, for example for security reasons or in order to better manage a telecommunications network, it is desired to physically limit the insertion of a connector into a particular adapter, and as a result prevent the transmission of data via that connector and adapter.

Referring to FIG. 1, a conventional LC type optical fiber connector 100 has a generally rectangular shape with a square cross section. The connector 100 includes a rectangular housing 110 comprised of a top side-wall 111, a bottom side-wall 112, a right side-wall 113 and a left side-wall 114, wherein the bottom side-wall 112 is opposite to the top side-wall 111 and connects with the right side-wall 113 and the left side-wall 114. A latch 120 is molded into the top side-wall 111 and includes a living hinge 125 which allows the tab 126 to be moved up and down in a direction perpendicular to the central axis 150-150 of the connector 100. The latch 120 includes a pair of protrusions 121 that are positioned on opposing sides of the tab 126. In addition, a ferrule 140 protrudes from the opening 116 of housing 110. A spring (not shown in the figure) is located inside the housing 110 to allow the ferrule 140 to move back and forth through the opening 111. A pair of protrusions 160 is positioned on the right side-wall 113 and left side-wall 114, respectively.

Referring to FIG. 2, a conventional LC type optical fiber adapter 200, such as an LC duplex adapter includes a generally rectangular housing 210. The housing 210 has an axial cavity defined by a top side-wall 211, a bottom side-wall 212, a right side-wall 213 and a left side-wall 214. The axial cavity is divided into two halves by a compartment wall 215 that is parallel to the right side-wall 213 and left side-wall 214 and connects with the top side-wall 211 and bottom side-wall 212. The half of the axial cavity defined by the top side-wall 211, bottom side-wall 212, compartment wall 215 and right side-wall 213 is named as the right axial cavity and the other half of the axial cavity defined by the top side-wall 211, bottom side-wall 212, compartment wall 215 and left side-wall 214 is named as the left axial cavity. Each of the right and left axial cavities has an opening 208. A pair of indentations 220 mating with the protrusions 160 on the connector 100 is arranged in the left axial cavity on the left side-wall 214 and compartment wall 215, respectively. Similarly, the indentations 220 are also arranged in the right axial cavity on the right side-wall 213 and compartment wall 215, respectively. When the connector 100 of FIG. 1 is fully inserted into the adapter 200 through either of the openings 208, the protrusions 160 on the connector 100 will be placed in the indentations 220. Two hollow cylinders 240 are axially positioned in the right and left axial cavities respectively to receive the ferrule 140 of the connector 100. In addition, the adapter 200 further includes reciprocal locking mechanisms 230 which, referring to FIG. 1, mate with the latch 120, thereby securely interlocking the connector 100 with the adapter 200 when the connector 100 is completely inserted into the adapter 200.

In order to solve the above problem, some manufacturers change the cylinder 240 of the adapter 200 from the round cross-sectional shape to a particular shape. With such design, only a connector that the opening of the housing thereof has a shape mating with the cylinder 240, like one shown in FIG. 1, can be fully inserted into the adapter 200. The object of physically limiting the insertion of a connector into a particular adapter can therefore be achieved.

However, if one user inadvertently inserts an unmated connector into the adapter 200, the user cannot notice until a great part of the connector is inserted into the adapter 200. This will therefore increase the risk of damage to them.

Accordingly, there exists a need to provide an optical fiber connector and adapter to solve the above-mentioned problems.

SUMMARY OF THE INVENTION

The present invention provides an optical fiber connector and adapter. The connector is provided with an indentation thereon and the adapter is provided therein with a protrusion mating with the indentation thereby physically limiting the insertion of a connector into a particular adapter.

In one embodiment, the optical fiber connector of the present invention includes a housing and a latch. The housing has a front end, a first side-wall, a second side-wall, a third side-wall and a fourth side-wall, wherein the third side-wall is opposite to the first side-wall and connects with the second and fourth side-walls. The housing is provided with an affixed tip with external outward planar surface indentation feature. The housing is provided with an indentation that is positioned on the edge of the third side-wall and adjacent to the second side-wall. The indentation extends from the affixed tip at the front end. A corresponding affixed tip protrusion provided at the outward planar surface of an optical fiber adapter will be placed in the indentation on the optical fiber connector when the optical fiber connector is inserted into the optical fiber adapter. The latch is positioned on the first side-wall of the housing.

In another embodiment, the optical fiber adapter of the present invention includes a housing, a hollow cylinder and a protrusion. The housing has an axial cavity defined by a first side-wall, a second side-wall, a third side-wall and a fourth side-wall, wherein the third side-wall is opposite to the first side-wall and connects with the second and fourth side-walls. The axial cavity has an opening. The hollow cylinder is axially positioned in the axial cavity. The protrusion is positioned on the third side-wall in the axial cavity and adjacent to the second side-wall. The protrusion will be placed in the corresponding indentation on an optical fiber connector when the optical fiber connector is inserted into the optical fiber adapter.

The foregoing, as well as additional objects, features and advantages of the invention will be more readily apparent

DETAILED DESCRIPTION OF THE PREFERRED EMBODIMENT

Figure 1:
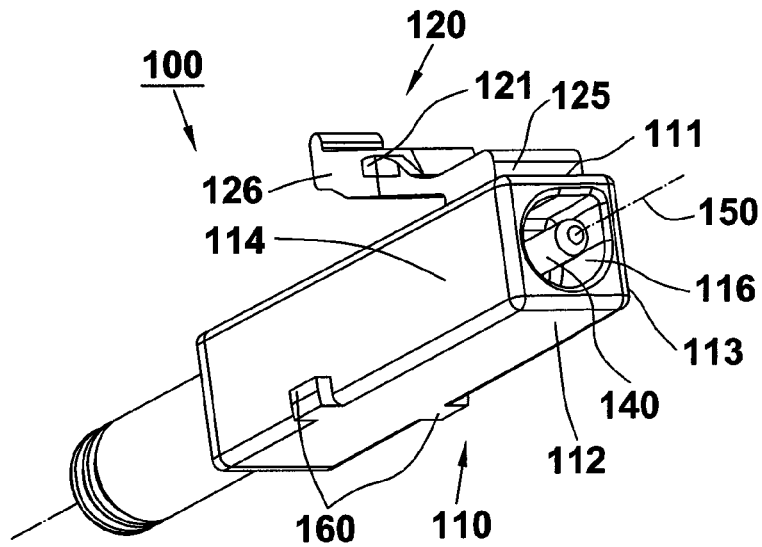
FIG. 1 is an elevated perspective view of a conventional LC type optical fiber connector.
Figure 3:
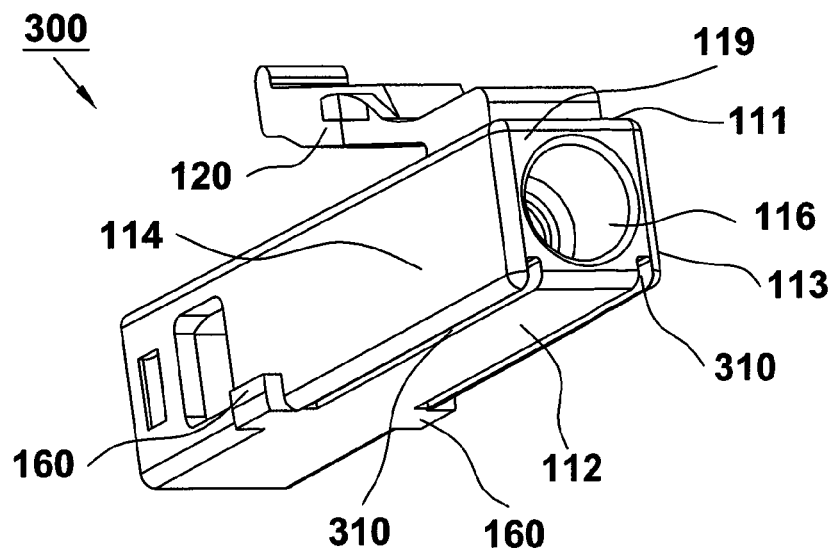
FIG. 3 is an elevated perspective view of the optical fiber connector according to the first embodiment of the present invention.

Referring to FIG. 3, the optical fiber connector 300 according to the first embodiment of the present invention is similar to the optical fiber connector 100 of FIG. 1 and also includes the housing 110, latch 120 and protrusions 160. However, the opening 116 of the housing 110 for the connector 300 is circular. For simplicity, the ferrule of the connector 300 in FIG. 3 is omitted. In addition, the connector 300 is further provided with rectangular indentations 310 that are positioned on the edges of the bottom side-wall 112 and adjacent to the right side-wall 113 and left side-wall 114, respectively. The indentations 310 extend from the front end 119 of the housing 110.

Figure 4:
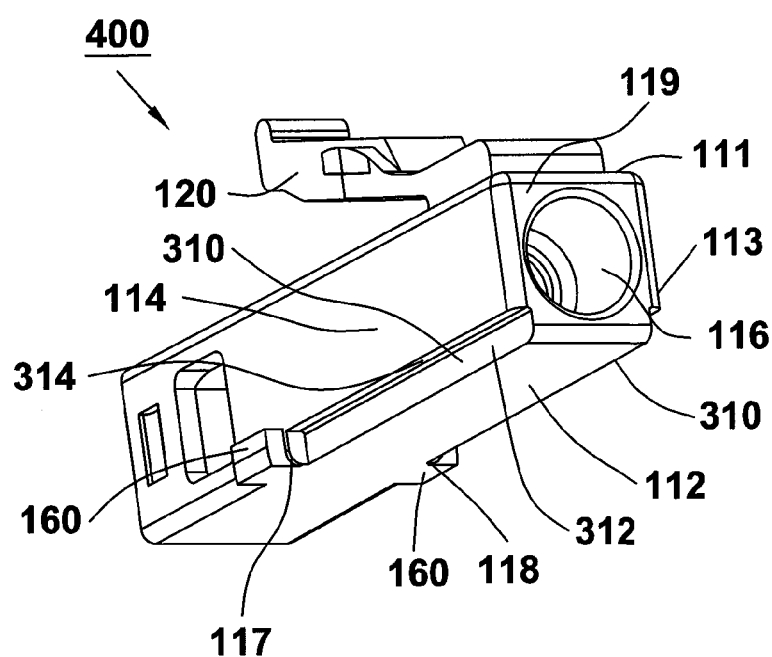
FIG. 4 is an elevated perspective view of the optical fiber connector according to the second embodiment of the present invention.

Referring to FIG. 4, the optical fiber connector 400 according to the second embodiment of the present invention is similar to the optical fiber connector 300 of FIG. 3 and includes the housing 110, latch 120 and protrusions 160. The opening 116 of the housing 110 for the connector 400 is circular. For simplicity, the ferrule of the connector 400 in FIG. 4 is also omitted. However, the indentations 310 for the connector 400 are arranged on different positions, wherein one of the indentations 310 is positioned on the common boundary 117 between the bottom side-wall 112 and left side-wall 114, and the other is positioned on the common boundary 118 between the bottom side-wall 112 and right side-wall 113. These indentations 310 also extend from the front end 119 of the housing 110. Each of the indentations 310 has at least two walls 312 and 314 that are parallel to the left side-wall 114 and bottom side-wall 112, respectively.

Figure 5:
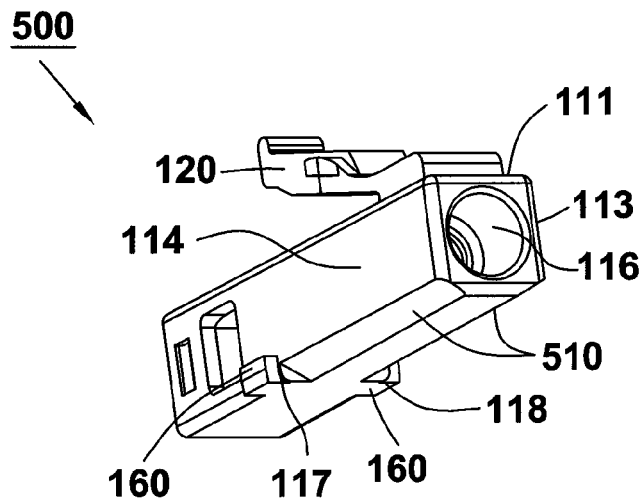
FIG. 5 is an elevated perspective view of the optical fiber connector according to the third embodiment of the present invention.

Referring to FIG. 5, the optical fiber connector 500 according to the third embodiment of the present invention is similar to the optical fiber connector 100 of FIG. 1 and also includes the housing 110, latch 120 and protrusions 160. For simplicity, the ferrule of the connector 500 in FIG. 5 is omitted. In addition, a cut face 510 is formed on the common boundary 117 between the bottom side-wall 112 and left side-wall 114 and another cut face 510 is formed on the common boundary 118 between the bottom side-wall 112 and right side-wall 113. The cut faces 510 can be plane.

Figure 2:
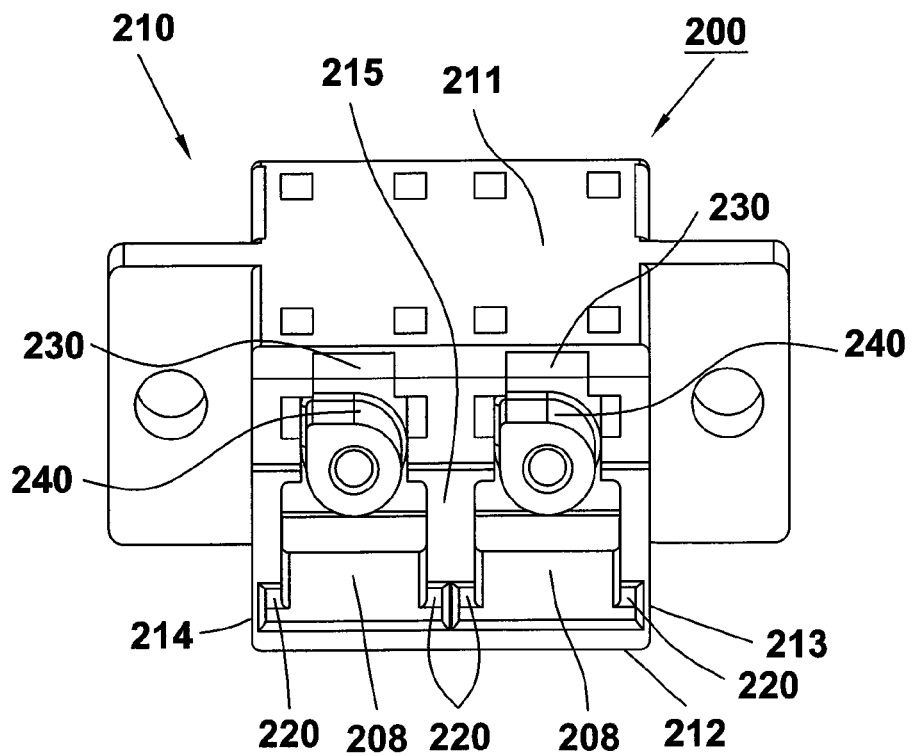
FIG. 2 is an elevated perspective view of a conventional LC type optical fiber adapter.
Figure 6:
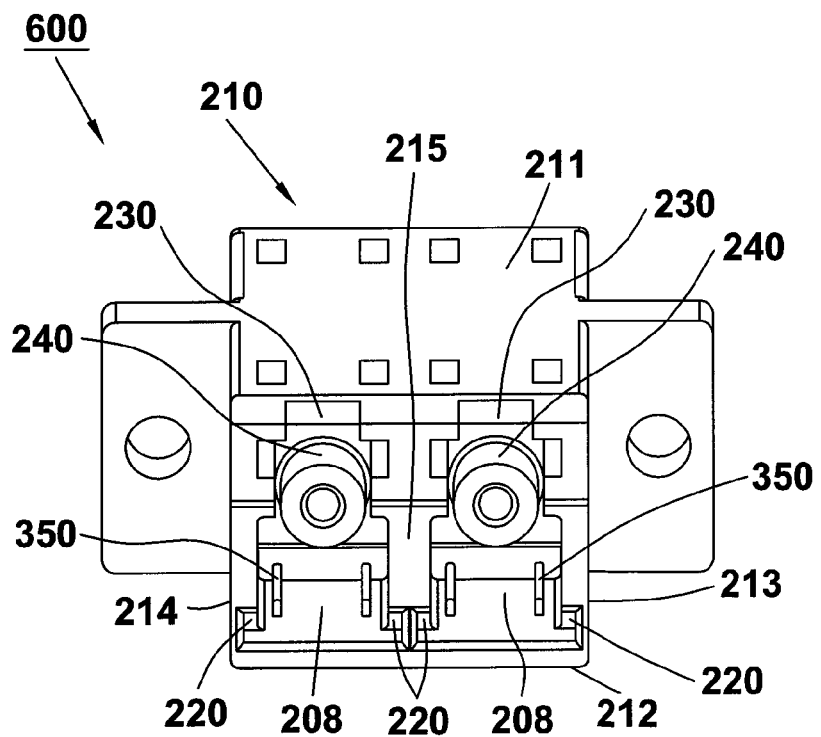
FIG. 6 is an elevated perspective view of the optical fiber adapter according to the first embodiment of the present invention.

Referring to FIG. 6, the optical fiber adapter 600 according to the first embodiment of the present invention is similar to the optical fiber adapter 200 of FIG. 2 and also includes the housing 210 and hollow cylinder 240. However, the cylinder 240 has a round cross-sectional shape. In addition, the adapter 600 is further provided in the right and left axial cavities with rectangular protrusions 350 mating with the indentations 310 of the connector 300. Specifically, two of the protrusions 350 are positioned on the bottom side-wall 212 in the right axial cavity and adjacent to the right side-wall 213 and compartment wall 215, respectively. The other two protrusions 350 are positioned on the bottom side-wall 212 in the left axial cavity and adjacent to the left side-wall 214 and compartment wall 215, respectively. When the connector 300 is inserted into the adapter 600 through either of the openings 208, the protrusions 350 of the adapter 600 will be placed in the indentations 310 on the connector 300.

Figure 7:
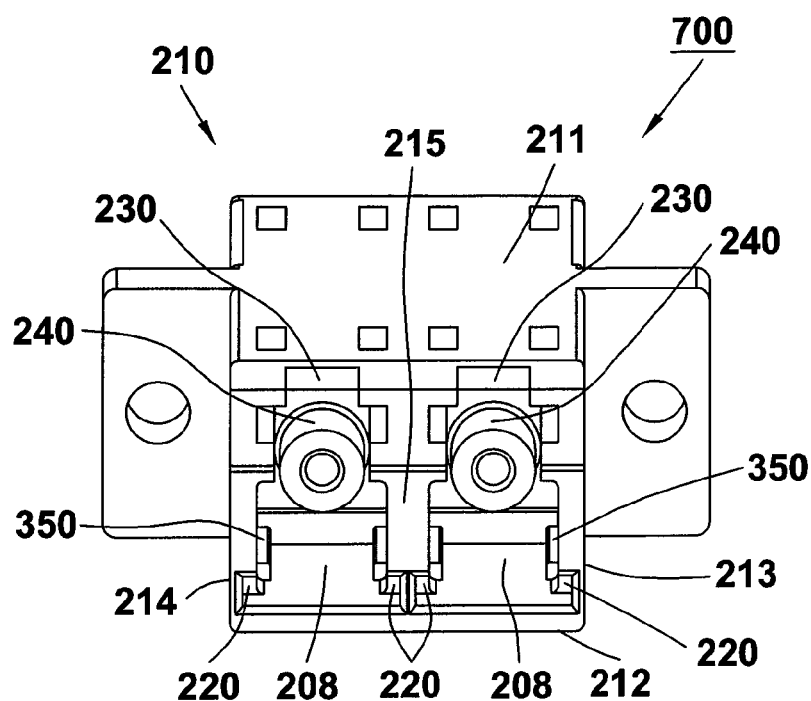
FIG. 7 is an elevated perspective view of the optical fiber adapter according to the second embodiment of the present invention.

Referring to FIG. 7, the optical fiber adapter 700 according to the second embodiment of the present invention is similar to the optical fiber adapter 600 of FIG. 6 and also includes housing 210, hollow cylinder 240 and protrusions 350. The protrusions 350 of the adapter 700 are similarly positioned on the bottom side-wall 212. However, these protrusions 350 further connect with the right side-wall 213, left side-wall 214 and compartment wall 215, respectively. Specifically, the protrusions 350 of the adapter 700 are positioned on the common boundaries between the bottom side-wall 212 and right side-wall 213, left side-wall 214 and compartment wall 215. The protrusions 350 of the adapter 700 mate with the indentations 310 of the connector 400 such that the protrusions 350 of the adapter 700 will be placed in the indentations 310 on the connector 400 when the connector 400 is inserted into the adapter 700 through either of the openings 208.

Figure 8:
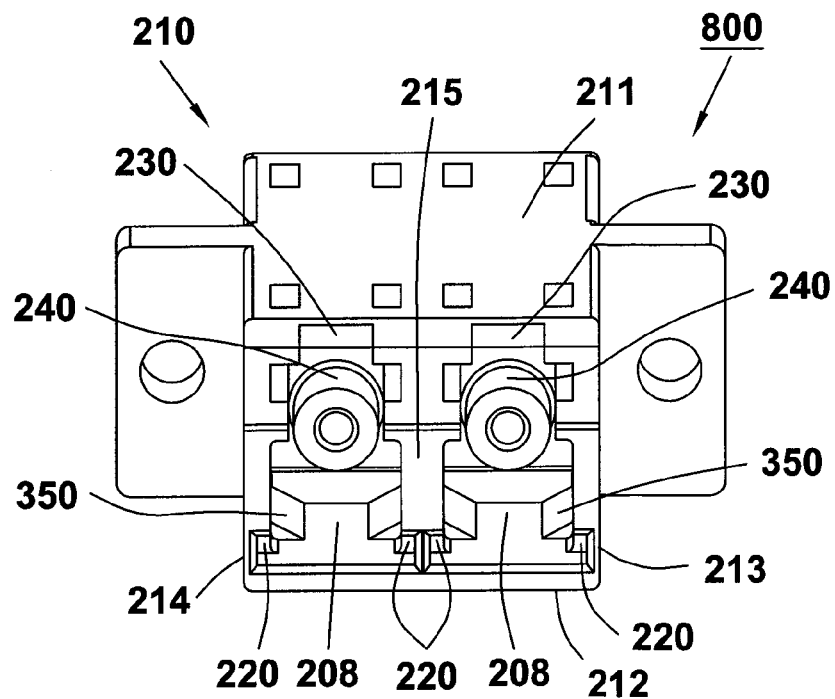
FIG. 8 is an elevated perspective view of the optical fiber adapter according to the third embodiment of the present invention.

Referring to FIG. 8, the optical fiber adapter 800 according to the third embodiment of the present invention is similar to the optical fiber adapter 700 of FIG. 7 and also includes housing 210, hollow cylinder 240 and protrusions 350. The protrusions 350 of the adapter 800 are similarly positioned on the bottom side-wall 212 and connect with the right side-wall 213, left side-wall 214 and compartment wall 215, respectively. However, the protrusions 350 of the adapter 800 are triangular and mate with the cut faces 510 of the connector 500. When the connector 500 is inserted into the adapter 800 through either of the openings 208, the protrusions 350 of the adapter 800 will be brought into contact with the cut faces 510 of the connector 500.

According to the present invention, the protrusions 350 are positioned on or adjacent to the boundaries between the bottom side-wall 212 and right side-wall 213, left side-wall 214 and compartment wall 215. With such design, a user is easier to notice these keyed features. Accordingly, the opportunity of inserting an unmated connector into the adapter can be reduced. In order to allow these keyed features to be more noticeable, the protrusions 350 can be positioned close to the opening 208 of the housing 210. For example, the protrusions 350 are positioned closer to the opening 208 than the cylinder 240. Of course, it is necessary to increase the lengths of the indentations 310 or cut faces 510 on the connectors 300, 400, 500 in order to mate with the protrusions 350 close to the opening 208.

Figure 9A:
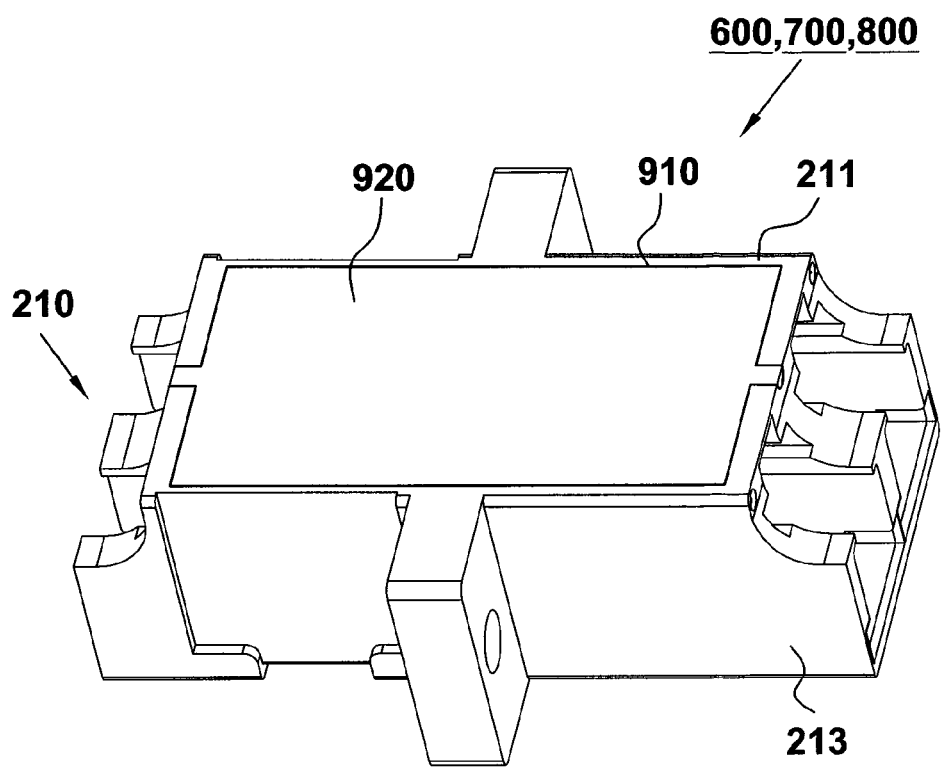
FIG. 9a is an elevated perspective view of the optical fiber adapter of the present invention, wherein a plate is attached in the indentation on the outer surface of the top side-wall.
Figure 9B:
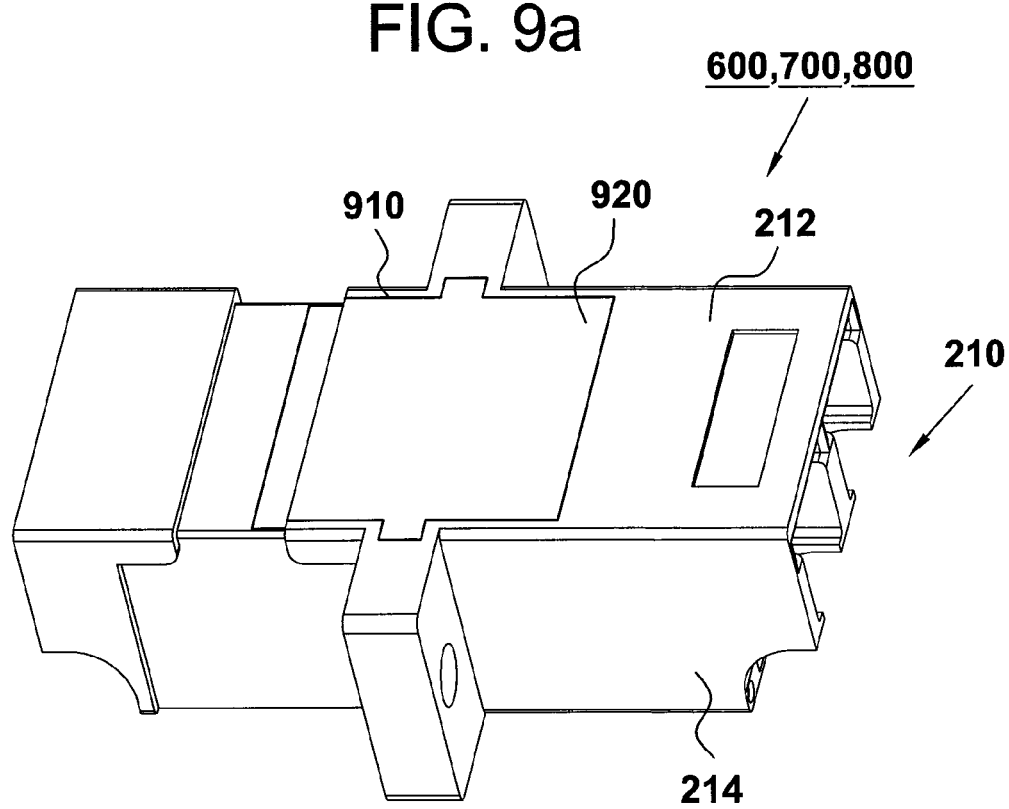
FIG. 9b is an elevated perspective view of the optical fiber adapter of the present invention, wherein a plate is attached in the indentation on the outer surface of the bottom side-wall.

Referring to FIGS. 9a and 9b, in order to facilitate users to identify the adapters 600, 700, 800 of the present invention are used to receive what types of optical fiber connectors, for example, APC (angled physical contact) connectors, UPC (ultra physical contact) connectors or multimode connectors, an indentation 910 is formed on the outer surface of the top side-wall 211 or bottom side-wall 212 of the adapter 600, 700, 800. A plastic plate 920 is then attached in the indentation 910 by adhesive, hook or ultrasonic welding and is flush with the outer surface of the top side-wall 211 or bottom side-wall 212. In addition, the plate 920 has a color different from that of the outer surface of the top side-wall 211 or bottom side-wall 212 and the color thereof indicates the adapter is configured to receive what type of connector. For example, the green plate 920 stands for receiving APC type connectors, the blue plate 920 stands for receiving UPC type connectors and the beige plate 920 stands for receiving multimode connectors. In this manner a user can easily identify the adapters 600, 700, 800 are configured to receive what types of optical fiber connectors by the color of the cover 920.

It should be noted that although the present invention is illustrated with duplex adapters, simplex or other multiplex can also be adopted to achieve the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber adapter configured for receiving an optical fiber connector, the optical fiber connector having a front end and defining a longitudinal dimension extending from the front end and an exterior surface comprising at least one longitudinal slot therein, the optical fiber adapter comprising:
   a housing having an axial cavity, the axial cavity having an opening and a longitudinal dimension extending from the opening, and the housing comprising:
   a first side-wall, a second side-wall, a third side-wall and a fourth side-wall, with the third side-wall being opposite to the first side-wall and connecting the second and fourth side-walls, each of the first, second, third and fourth side-walls having an internal face defining at least a portion of the axial cavity;
   a hollow cylinder axially positioned in the axial cavity;
   at least one protrusion positioned on the third side-wall in the axial cavity spaced away from the internal face of each of the second side-wall and the fourth side-wall, and extending longitudinally, the at least one protrusion being located away from the opening of the axial cavity, and the at least one protrusion is configured for mating with and being inserted into a corresponding longitudinal slot of the optical fiber connector when the optical fiber connector is inserted into the optical fiber adapter.

2. The optical fiber adapter as claimed in claim 1, wherein the at least one protrusion is positioned closer to the opening of the axial cavity than the cylinder.

3. The optical fiber adapter as claimed in claim 1, wherein the protrusion has a rectangular cross-section in a direction normal to the longitudinal dimension.

4. The optical fiber adapter as claimed in claim 1, wherein the at least one protrusion comprises a first protrusion and a second protrusion spaced apart from the first protrusion, wherein the first protrusion is spaced away from the internal face of the second side-wall and the second protrusion is spaced away from the internal face of the fourth side-wall.

5. The optical fiber adapter as claimed in claim 4, wherein each of the first protrusion and the second protrusion has a rectangular cross-section in a direction normal to the longitudinal dimension.

6. The optical fiber adapter as claimed in claim 1, wherein the housing has an exterior surface, and the housing further comprises an identification plate attached to the outer surface, the identification plate has a color different from a color of the housing and the color of the identification plate correlates to a specific type of adapter.

7. The optical fiber adapter as claimed in claim 6, wherein the exterior surface of at least one of the first and third side-walls comprises an indentation for receiving the identification plate therein.

8. The optical fiber adapter as claimed in claim 7, wherein the identification plate is attached by one of adhesive, hook, or ultrasonic welding.

* * * * *